United States Patent [19]

Kondo

[11] Patent Number: 4,712,963
[45] Date of Patent: Dec. 15, 1987

[54] APPARATUS FOR SOLDERING PRINTED CIRCUIT BOARDS

[75] Inventor: Kenshi Kondo, Tokyo, Japan

[73] Assignee: Nihon Den-Netsu Keiki Co. Ltd., Tokyo, Japan

[21] Appl. No.: 550,092

[22] Filed: Nov. 9, 1983

[30] Foreign Application Priority Data

Jan. 18, 1983 [JP] Japan .................... 58-5281

[51] Int. Cl.⁴ .............................. B65H 5/00
[52] U.S. Cl. ................................. 414/222; 414/331; 414/417; 29/822
[58] Field of Search ............. 414/222, 14, 17, 18, 414/331, 417, 43, 100, 102, 118, 278; 29/822; 198/486, 740, 463.3, 465.1, 435

[56] References Cited

U.S. PATENT DOCUMENTS

| | | | |
|---|---|---|---|
| 3,013,648 | 12/1961 | Kovach | 414/43 X |
| 3,583,580 | 6/1971 | Dean | 414/102 X |
| 3,967,740 | 7/1976 | Molins | 414/417 X |
| 4,062,463 | 12/1977 | Hillman et al. | 414/225 |
| 4,065,003 | 12/1977 | Hostettler | 414/222 X |
| 4,103,787 | 8/1978 | Salloum | 414/278 X |
| 4,336,438 | 6/1982 | Uehara | 414/222 X |
| 4,405,277 | 9/1983 | Burkner et al. | 198/435 X |

FOREIGN PATENT DOCUMENTS 2405020  6/1979  Fed. Rep. of Germany ...... 414/331

Primary Examiner—Robert J. Spar
Assistant Examiner—Donald W. Underwood
Attorney, Agent, or Firm—Stephen F. K. Yee

[57] ABSTRACT

Printed circuit boards to be soldered are placed in a magazine and automatically fed, one by one, to a printed circuit board-processing line. The processed boards are automatically collected in another, empty magazine. Lifting means is provided for vertically displacing the boards-carrying magazine to position respective boards at a predetermined feed location where an air cylinder feeds each board to the processing line. Another lifting means is provided for vertically displacing the empty magazine to position respective holding members of the magazine at a delivery location and to receive therein the processed board displaced by an air cylinder.

5 Claims, 8 Drawing Figures

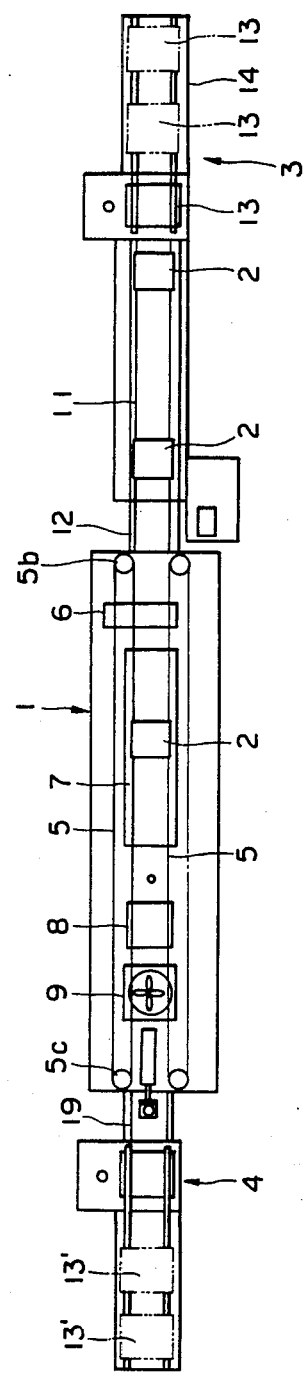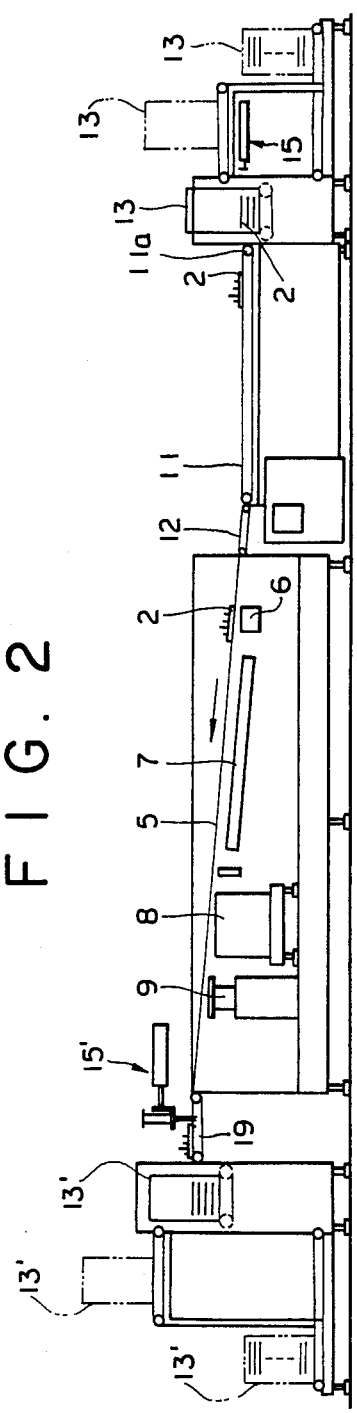

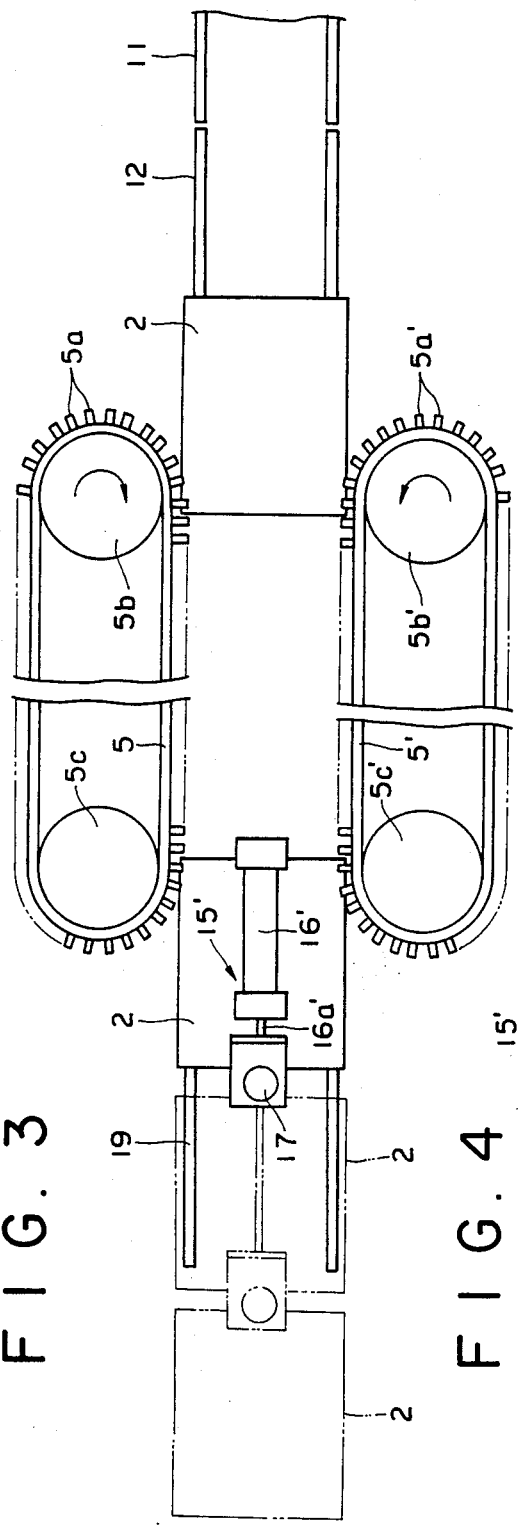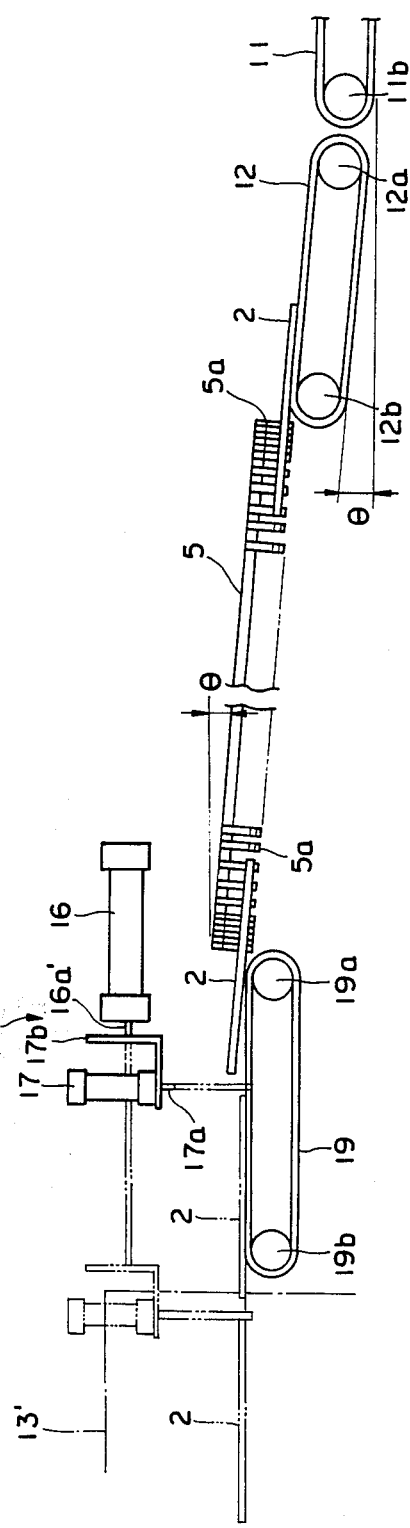
FIG. 3
FIG. 4

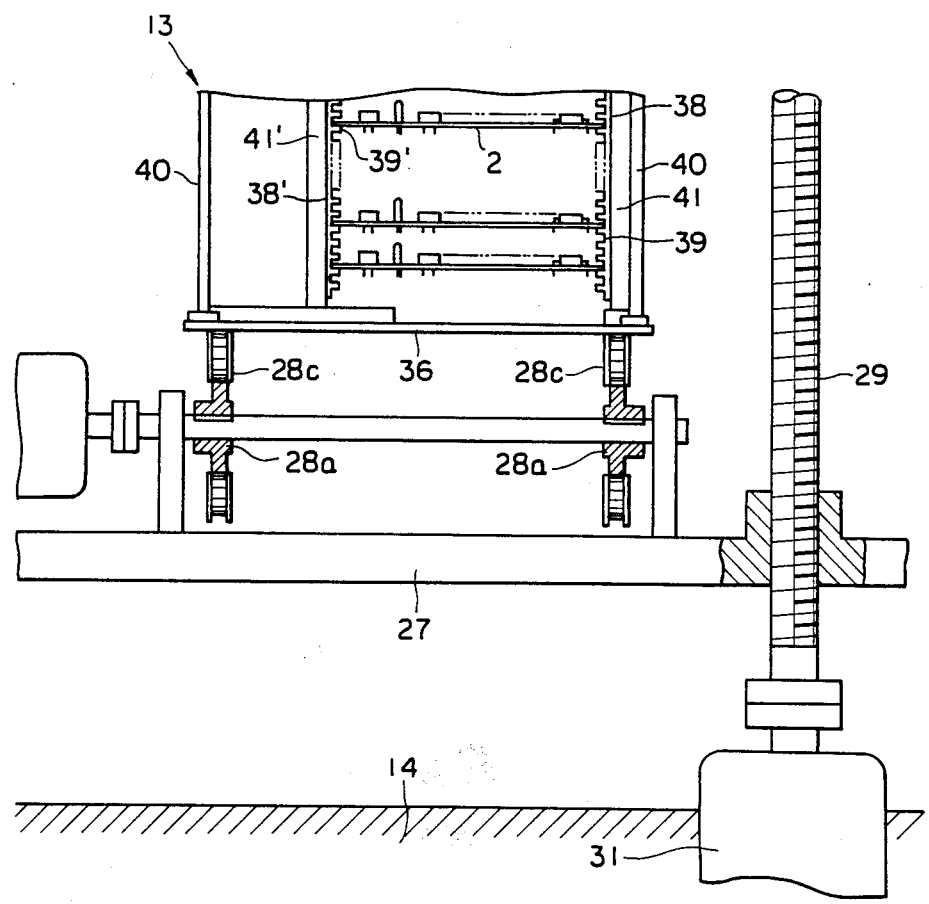

APPARATUS FOR SOLDERING PRINTED CIRCUIT BOARDS

BACKGROUND OF THE INVENTION

This invention relates generally to an apparatus for soldering printed circuit board and, more specifically, to a fully automated apparatus capable of automatically feeding printed circuit boards stored in a magazine one by one to a series of processing zones and automatically collecting the processed boards in another magazine.

In recent years, a number of improved automatic soldering apparatuses have been proposed to meet an increased demand therefor. Such improvements have been, however, generally directed to a soldering station where the printed circuit boards are brought into contact with molten solder for effecting dip or touch soldering. Thus, little attempt has been made to improve the other mechanisms. For example, it has been the general practice to manually feed printed circuit boards one by one to a transfer line for processing them at the soldering station.

SUMMARY OF THE INVENTION

It is, therefore, an object of the present invention to provide a fully automated apparatus for soldering printed circuit boards.

It is a special object of the present invention to provide an apparatus capable of automatically feeding printed circuit boards to a printed circuit board-processing line and of automatically collecting the processed boards.

In accomplishing the foregoing objects, there is provided in accordance with the present invention an apparatus for soldering printed circuit board, comprising: first and second magazines, each having a plurality of holding members adapted for supporting a a plurality of printed circuit boards in parallel and vertically spaced apart positions within each magazine; a first moveable member adapted for supporting the first magazine thereon; first means for vertically displacing the first supporting member to successively position respective printed circuit boards held by the holding members of the first magazine at a feed location; transfer means for receiving the printed circuit board located at the feed location and for transfering the received printed circuit board through a series of work stations, including a soldering station where the printed circuit board is brought into contact with molten solder, said transfer means positioning the worked printed circuit board at a delivery location; means for moving the printed circuit board located at the feed location to displace it on the transfer means; a second moveable supporting member adapted for supporting the second magazine thereon; second means for vertically displacing the second supporting member to successively position respective holding members of the second magazine at a receiving location; and means for moving the printed circuit board located at the delivery location to displace it on the holding member located at the receiving location.

BRIEF DESCRIPTION OF THE DRAWINGS

Other objects, features and advantages of the present invention will become apparent from the detailed description of the preferred embodiments which follows, when considered in light of the accompanying drawings, in which:

FIG. 1 is a plan view schematically showing the soldering apparatus according to the present invention;

FIG. 2 is an elevational view of FIG. 1;

FIG. 3 is an enlarged fragmentary plan view showing the entrance and exit portions of the processing stations of FIG. 1;

FIG. 4 is an elevational view of FIG. 3;

FIG. 7 is a cross-sectional, fragmentary view taken along the line VII—VII of FIG. 6.

DETAILED DESCRIPTION OF THE PREFERRED EMBODIMENTS OF THE INVENTION

Figure 5:
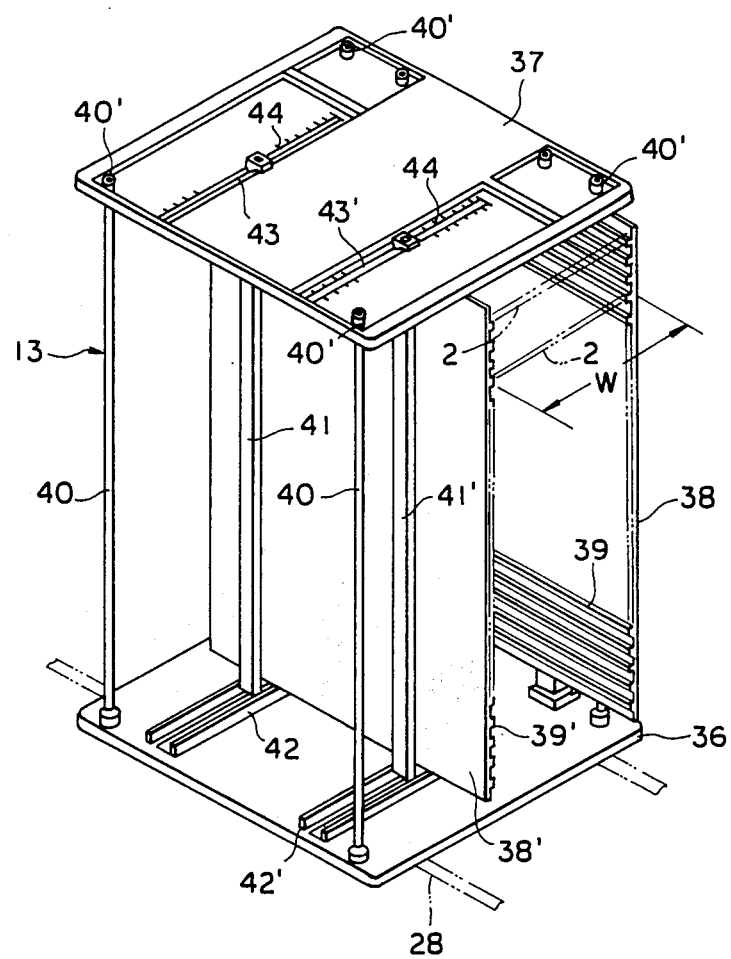
FIG. 5 is a perspective view diagrammatically showing an example of a magazine for storing printed circuit boards.

Referring first to FIGS. 1 and 2, the reference numeral 1 generally denotes the soldering apparatus according to the present invention. The apparatus has a series of conveyor chains 11, 12, 5, 19 defining a predetermined transfer path along which printed circuit boards 2 travel. A series of work stations such as a fluxing station 6, a heating station 7, a soldering station 8 and a cooling station 9 are provided in a manner known per se along the transfer path. Thus, as the printed circuit board travels along the transfer path, it is first treated with a flux in the fluxing station 6. The treated board, after being preheated in the heating station 7, is subjected to a soldering treatment by contact with a molten solder in the soldering station 8 and then cooled during its passage through the cooling station 9.

An example of the conveyor chains 5 is shown in FIGS. 3 and 4. A pair of endless roller chains 5, 5' are respectively in mesh with two pairs of drive and idler sprockets 5b and 5c, and 5b' and 5c' arranged so that the chains 5 and 5' are parallel with each other and inclined by an angle $\theta$ with respect to the horizontal plane. Each of the chains 5 and 5' is provided with a plurality of supporting members such as hooks 5a and 5a' each having a groove of a shape suited for engagement with the side end portion of the printed circuit board 2.

Upon actuation of the drive sprockets 5b and 5b', the printed circuit board 2 fed at a position between the sprockets 5b and 5b' is caught and received by the supporting members 5a and 5a' with its both sides being in engagement with the grooves of the supporting members 5a and 5a', thereby the printed circuit board 2 is supported by the supporting members 5a and 5a' for movement therewith.

The conveyor chains 11, 12 and 19 are in the form of a free flow type and are in mesh with pairs of drive and idler sprockets, 11a and 11b, 12a and 12b and 19a and 19b, respectively. The printed circuit board is directly placed on respective chains and is displaced therewith. The conveyor chains 11 and 19 are disposed horizontally while the chains 12 are oriented at the same angle as the chains 5 to facilitate the engagement of the grooves of the supporting members 5a and 5a' with the printed circuit board 2.

As shown in FIGS. 1 and 2, feeder 3 and collector 4 are provided upstream and downstream ends of the transfer path, respectively. The feeder 3 is so constructed as to successively feed printed circuit boards stored in a first magazine to the transfer path, while the collector 4 is so constructed as to successively collect the printed circuit boards, which have been processed in the work stations, in a second magazine.

The printed circuit boards to be treated are stored in a magazine such that they are vertically spaced, generally equally, with each other. FIG. 5 shows one preferred structure of a portable magazine 13. The magazine 13 has upper and lower plates 37 and 36, interconnected by four support bars 40 and nuts 40' at their corners between which a first side plate 38 is fixedly supported. Provided in parallel with the first side plate 38 is a second side plate 38' fixedly secured to a pair of slidable bars 41 and 41'. The bars 41 and 41' have their lower ends received in parallel grooves 42 and 42' formed on the lower plate 36 and their upper ends received in parallel guide apertures 43 and 43' formed in the upper plate 37. Along each of the guides 43 and 43' are formed graduations 44. From the position of the upper end of the bar 41 on the graduations 44, the distance W between the first and second side plates 38 and 38' are seen. Provided on the inside of the side plates 38 and 38' are a plurality of holding members 39 and 39' such as a plural pairs of parallel, vertically equally spaced grooves for supporting therebetween a plurality of printed circuit boards.

In use, the nuts 40' are loosened and the bars 41 and 41' are slid to adjust the distance W between the two side plates 38 and 38' to a value suitable for supporting the printed circuit boards to be treated between the grooves 39 and 39'. Thereafter, the nuts 40' are fastened to fix the entire construction. A desired number of printed circuit boards to be treated are then inserted in the grooves either manually or automatically so that they are arranged in the magazine 13 in parallel and vertically spaced apart positions.

Figure 6:
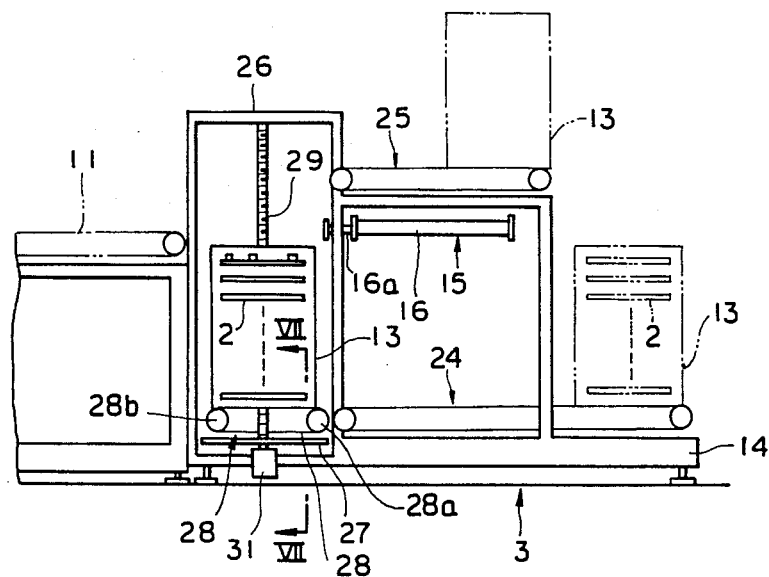
FIG. 6 is an elevational view diagrammatically showing a feeder according to the present invention.

FIGS. 6 and 7 illustrate a preferred embodiment of the feeder 3. The feeder 3 includes a moveable supporting member 27 having an internally threaded bore meshed with a vertically extending feed screw 29. The screw 29 has an upper end rotatably received by an upper frame 26 and an lower end connected to a motor 31 fixed on a lower frame 14. By driving the motor 31, the screw 29 is rotated about its axis to move the supporting member 27 upward and downward along a guide (not shown) according to the foreward or reverse rotation of the motor 31.

Thus, by driving the motor 31 in a controlled manner, the magazine 13 on the supporting member 27 is vertically displaced with the printed circuit boards therein being positioned successively at a predetermined feed location. First means 15 is provided adjacent to the feed location to displace the printed circuit board positioned at the feed location onto the upstream end of the transfer path, i.e. transfer chain 11. The first means 15 in the illustrated embodiment includes an air cylinder 16 whose operating rod 16a has an end portion adapted for abutting engagement with the rear end of the printed circuit board which is positioned at the feed location. When the air cylinder 16 is actuated, the operating rod 16a extends onto urge the printed cirucit board to the chain 11.

In order to automatically position the magazine 13 on the supporting member 27, the feeder 3 is preferably provided with a magazine displacing mechanism as shown in FIG. 6. Mounted on the supporting member 27 is a first displacing means 28 adapted for supporting the magazine 13 thereon and for displacing it in the horizontal direction. The displacing means 28 in this embodiment includes two pairs of horizontally spaced apart drive and idler sprocket wheels 28a and 28b between which two endless chains 28c are provided for meshing engagement therewith.

A second displacing means 24, such as a sprocket and chain mechanism, is provided on the lower frame 14 and arranged so that it can aline with the first displacing means 28 on the supporting member 27 when the supporting member is in a predetermined lower position and so that the magazine 13 placed on the second displacing means 24 can be displaced onto the first displacing means 28 upon actuation of the both displacing means 24 and 28. Similarly, a third displacing means 25 is provided on the upper frame 26 so that when the supporting member 27 is in a predetermined upper position, the magazine 13 placed on the first displacing means 28 can be transferred to the third displacing means 25 by operation of the both means 28 and 25. The third displacing means, in cooperation with the first displacing means, serves as a means for withdrawing the empty magazine from the feeder 3.

The thus constructed feeder 3 operates as follows. The magazine 13 storing therein a plurality of printed circuit boards 2 is placed on an end of the second displacing means 24. The supporting member 27 is positioned at its lower position. Then, the displacing means 24 and 28 are operated to displace the magazine 13 onto the first displacing means 28 and stopped when the magazine 13 is positioned at a predetermined position. Then the motor 31 is driven to vertically displace (upwardly, in this illustrated case) the magazine so that the printed circuit boards are positioned one by one with a predetermined interval at the feed location. The air cylinder 16 is actuated every time the printed circuit board is positioned at the feed location to displace it onto the chain 11. When the all the printed circuit boards in the magazine 13 are fed to the conveyor chains 11, the supporting member 27 is positioned at the upper position to permit removal of the empty magazine 13 by operation of the first and third displacing means 28 and 25.

Figure 8:
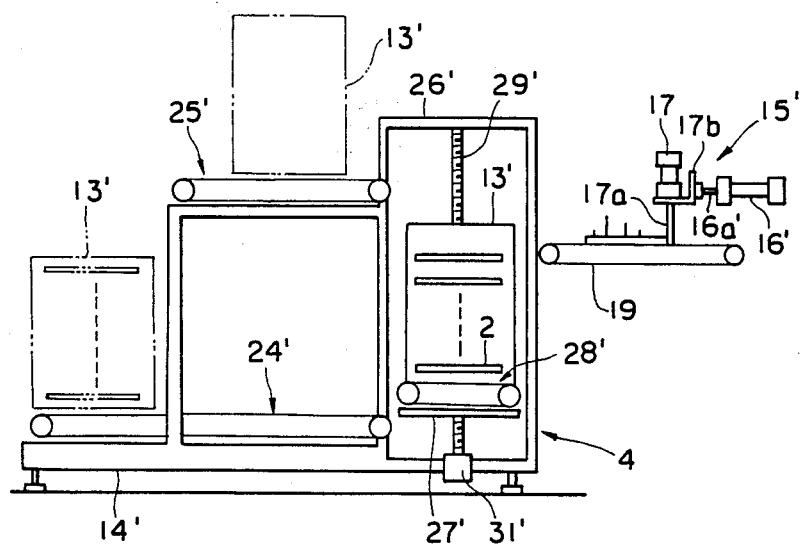
FIG. 8 is an elevational view, similar to FIG. 6, showing an example of a collector according to the present invention.

The collector 4 provided downstream of the transfer path has nearly the same construction as that of the feeder 3. In FIG. 8, corresponding parts are designated by similar reference numerals affixed with—'—. An empty magazine 13' is placed on a sixth displacing means 25' and a motor 31' is operated to position a moveable supporting member 27' at an upper location so that the fourth displacing means 28' is aligned with the six displacing means 25'. Then both displacing means 25' and 28' are operated to displace the magazine 13' from the sixth to fourth displacing means and to position it at a predetermined position on the fourth displacing means 28'. The motor 31' is then operated under a predetermined control so that the magazine 13' is vertically displaced (downward in the illustrated case) to position its holding members successively at a receiving location.

The printed circuit board which have been worked during its passage through the working stations is conveyed by the conveyor chains 19 and is positioned at a predetermined delivery location. Operating means 15' is provided at the terminal end portion of the transfer path to displace the printed circuit board positioned at the delivery location to the holding member of the magazine 13' positioned at the receiving location. The operating means in the illustrated embodiment includes a first air cylinder 17 fixedly secured on a moveable support 17b and a second air cylinder 16' whose operating rod 16a' is connected to the support 17b. The first cylinder 17 has a operating rod 17a adapted for engagement with the rear end of the printed circuit board.

The operating rods 15a' and 17a are in the retracted state when the printed circuit board is transferred by the transfer chains 19. The first cylinder 17 is actuated when the printed circuit board reaches the delivery location. Subsequently, the first cylinder is actuated to move the support 17b so that the printed circuit board is displaced into the magazine with the rear end of the board being in engagement with the operating rod 17a, and is received by the holding member positioned at the receipt location. Then the operating rods 16a' and 17a return to their retracted state to push the next printed circuit board.

When the magazine collects a predetermined number of the printed circuit boards, the motor 31' is actuated to move the supporting member 27' to a predetermined lower position in alignment with a fifth displacing means 24'. The operation of the fourth and fifth displacing means 28' and 24' can withdraw the magazine 13' holding therein a plurality of the worked printed circuit boards 2 from the collector 4.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

I claim:

1. An apparatus for soldering printed circuit boards having, in combination, a transfer means for receiving printed circuit boards provided at a feed location, for transferring the circuit boards through a series of work stations, including a soldering station where each circuit board is brought into contact with molten solder, and for positioning the worked circuit boards at a delivery location, and transport means for providing at the feed location circuit boards to be soldered and for removing the worked circuit boards from the delivery location, said transport means comprising:

first and second magazines having a plurality of holding members adapted for supporting a plurality of printed circuit boards in parallel and vertically spaced apart positions, the first magazine having a plurality of circuit boards to be soldered;

first movable supporting member adapted for supporting the first magazine thereon;

first means for vertically displacing the first movable supporting memeber to successively position at the feed location respective printed circuit boards held by the holding members of the first magazine;

first operating means for moving the printed circuit board located at the feed location to displace it onto the transfer means;

first means for transporting the first magazine past the feed location, including:

a first displacing means provided on the first movable supporting member and vertically movable therewith, and operable to displace horizontally the first magazine placed thereon;

a second displacing means operable to displace horizontally the first magazine placed thereon and located at a position so that the first magazine on the second displacing means can be transferred to the first displacing means when the first movable supporting member is at a predetermied lower position;

a third displacing means operable to displace horizontally the first magazine placed thereon and located at a position so that the first magazine on the first displacing means can be transferred to the third displacing means when the first movable supporting member is at a predetermined upper position, whereby the loaded first magazine is transferred to the first movable supporting member by the simultaneous operation of the first and second displacing means, with said first movable supporting member at said lower position, the first vertical displacing means operating to position successive circuit boards at the feed location where the first operating means displaces the board onto the transfer means, and the empty first magazine is transferred from the first movable supporting member by the simultaneous operation of the first and third displacing means, with said first movable supporting member at said upper position; and second means for transporting the second magazine pass the delivery location, including:

a second movable supporting member adapted for supporting the second magazine thereon;

second means for vertically displacing the second supporting member to successively position respective holding members of the second magazine at the delivery location; and second operating means for moving the worked printed circuit board located at the delivery location to displace it onto the holding member of the second magazine located at the receiving location.

2. An apparatus as set forth in claim 1, wherein the first operating means includes an air cylinder provided adjacent to said feed location and having an operating rod arranged for engagement with the rear end of the printed circuit board and for displacing the printed circuit board located at said feed location onto the transfer path as it extends.

3. An apparatus as set forth in claim 1, wherein the second operating means includes an air cylinder provided adjacent to said delivery location and having an operating rod arranged for displacing the printed circuit board located at said delivery location onto the holding member of the second magazine.

4. An apparatus as set forth in claim 1, wherein said second means for transporting the second magazine further includes:

a fourth displacing means provided on the second movable supporting member for vertical movement therewith and operable to displace horizontally the second magazine placed thereon;

a fifth displacing means operable to displace horizontally the second magazine placed thereon and provided at a position so that the second magazine on the fourth displacing means can be transferred to the fifth displacing means when the second movable supporting member is at a predetermined lower position; and a sixth displacing means operable to displace horizontally the second magazine placed thereon and provided at a position so that the second magazine on the sixth displacing means can be transferred to the fourth displacing means when the second movable supporting member is at a predetermined upper position, whereby the empty second magazine is transferred onto the second movable supporting member by the simultaneous operation of the sixth and fourth displacing means, with said second movable supporting member at said upper position, the second vertical displacing means operating to position respective holding members of the second magazine to receive a worked circuit board, and the loaded second magazine is transferred from the second movable supporting member to the fifth displacing means by the simultaneous operation of said fourth and fifth displacing means, with said second movable supporting member at said lower position.

5. An apparatus as set forth in claim 4, wherein each of the first to sixth displacing means includes a pair of laterally alined, parallel, endless conveyor chains each in meshing engagement with drive and idler sprocket wheels and adapted for supporting the magazine thereon.

* * * * *